(12) United States Patent
Sensharma et al.

(10) Patent No.: US 9,510,196 B2
(45) Date of Patent: Nov. 29, 2016

(54) METHOD AND APPARATUS FOR AUTHENTICATING A USER ON A MOBILE DEVICE

(71) Applicant: Qualcomm Incorporated, San Diego, CA (US)

(72) Inventors: Saurabh Sensharma, Uttar Pradesh (IN); Arvind Kulathu Ramachandran, Hyderabad (IN); Seyfullah Halit Oguz, San Diego, CA (US); Khaled Helmi El-Maleh, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 14/216,153

(22) Filed: Mar. 17, 2014

(65) Prior Publication Data

US 2015/0264567 A1 Sep. 17, 2015

(51) Int. Cl.
| | |
|---|---|
| *H04M 1/66* | (2006.01) |
| *H04N 13/00* | (2006.01) |
| *H04W 12/06* | (2009.01) |
| *G06K 9/00* | (2006.01) |
| *G06F 21/32* | (2013.01) |
| *H04L 29/06* | (2006.01) |
| *H04W 88/02* | (2009.01) |

(52) U.S. Cl.
CPC .............. *H04W 12/06* (2013.01); *G06F 21/32* (2013.01); *G06K 9/00288* (2013.01); *H04L 63/0861* (2013.01); *H04L 2463/082* (2013.01); *H04W 88/02* (2013.01)

(58) Field of Classification Search
CPC ... H04W 12/06; H04W 12/12; H04W 12/08; H04W 88/02; H04L 63/08
See application file for complete search history.

(56) References Cited

U.S. PATENT DOCUMENTS

| | | |
|---|---|---|
| 8,150,108 B2 | 4/2012 | Miller |
| 8,229,185 B2 | 7/2012 | Ennis et al. |
| 8,330,830 B2 | 12/2012 | Manico et al. |

(Continued)

FOREIGN PATENT DOCUMENTS

WO 2013089699 A1 6/2013

OTHER PUBLICATIONS

Azumio Inc., "Instant Heart Rate—Heart Rate Monitor by Azumio," <https://itunes.apple.com/us/app/instant-heart-rate-heart-rate/id395042892?mt=8>, Accessed Mar. 17, 2014.

(Continued)

*Primary Examiner* — Marivelisse Santiago Cordero
*Assistant Examiner* — Moustapha Diaby
(74) *Attorney, Agent, or Firm* — Blakely Sokoloff Taylor & Zafman LLP

(57) ABSTRACT

Disclosed is a method and apparatus for authenticating a user on a mobile device. The method may include initiating authentication of the user for access to the mobile device, where access to the mobile device is granted upon successful authentication of the user by the mobile device. The method may also include performing face recognition analysis on an image of a face of the user to determine an identity of the user. Furthermore, the method may also include determining whether a first pulse information and a second pulse information associated with the user indicate a pulse match. The method may also include authenticating the user for access to the mobile device when a pulse match is determined and the determined identity of the user has permission to access the mobile device.

30 Claims, 4 Drawing Sheets

(56) References Cited

U.S. PATENT DOCUMENTS

| | | | |
|---|---|---|---|
| 8,538,158 B1 | | 9/2013 | Denise |
| 8,922,342 B1* | | 12/2014 | Ashenfelter ....... G07C 9/00087 340/5.52 |
| 8,925,058 B1* | | 12/2014 | Dotan ................. H04L 63/0861 713/186 |
| 8,949,619 B2 | | 2/2015 | Parry et al. |
| 8,984,622 B1* | | 3/2015 | Baldwin et al. ................. 726/16 |
| 2003/0103652 A1 | | 6/2003 | Lee et al. |
| 2003/0128389 A1 | | 7/2003 | Matraszek |
| 2004/0091137 A1 | | 5/2004 | Yoon et al. |
| 2004/0179719 A1 | | 9/2004 | Chen et al. |
| 2005/0147298 A1 | | 7/2005 | Gallagher et al. |
| 2005/0173521 A1* | | 8/2005 | Coughlin et al. ............. 235/382 |
| 2005/0249381 A1 | | 11/2005 | Silvester et al. |
| 2006/0078170 A1* | | 4/2006 | Kamata et al. ............... 382/115 |
| 2007/0113099 A1 | | 5/2007 | Takikawa et al. |
| 2009/0133051 A1 | | 5/2009 | Hildreth |
| 2011/0273286 A1* | | 11/2011 | Sklar ........................ 340/539.12 |
| 2013/0322705 A1* | | 12/2013 | Wong ............................ 382/118 |
| 2014/0007224 A1 | | 1/2014 | Lu et al. |
| 2014/0068740 A1 | | 3/2014 | Lecun et al. |
| 2015/0046996 A1 | | 2/2015 | Slaby et al. |

OTHER PUBLICATIONS

Kashyap, "Google Android Jelly Bean gets Liveness Check for Face Unlock," <http://gm.kochar.com/post/google-android-jelly-bean-gets-liveness-check-for-face-unlock.aspx>, Jul. 2, 2012.

MacroPinch Ltd., "Cardiograph: Heart Rate Pulse Measurement using your iPhone & iPad Camera—Track the Cardio Fitness of your Friends and Family," <https://itunes.apple.com/in/app/cardiograph-heart-rate-pulse/id441079429?mt=8>, Accessed Mar. 17, 2014.

Taylor, Gabrielle, "Flawed Laptop Fingerprint Readers Make Your Windows Password Vulnerable to Hackers," <http://null-byte.wonderhowto.com/inspiration/flawed-laptop-fingerprint-readers-make-your-windows-password-vulnerable-hackers-0139037/>, Accessed Mar. 17, 2014.

TricksAge, "Forgot pattern lock on android? Easy way to solve forgot my android lock pattern problem," <http://www.tricksage.com/2013/05/forgot-pattern-lock-on-android-easy-way.html>, May 15, 2013.

Wu, Hao-Yu, et al, "Eulerian Video Magnification for Revealing Subtle Changes in the World," < http://people.csail.mit.edu/mrub/vidmag/>, Last Updated Jul. 2013.

"Medusa Fingerprint Scanner—Android Informer," Jan. 9, 2014, Retrieved dated on Apr. 21, 2015, Retrieved from the Internet , 2 Pages.

"ICE Unlock User Guide", 2014, 4 Pages.

International Search Report and Written Opinion—PCT/US2015/016401—ISA/EPO—Jun. 1, 2015.

Miyaji M., et al., "Internet-Based Survey on Driver's Psychosomatic State for the Creation of Driver Monitor Function", 3rd International Congress on Ultra Modern Telecommunications and Control Systems and Workshops (ICUMT), Oct. 5-7, 2011, IEEE, pp. 1-6.

International Preliminary Report on Patentability—PCT/US2015/016401, ISA/EPO dated Mar. 15, 2016.

* cited by examiner

METHOD AND APPARATUS FOR AUTHENTICATING A USER ON A MOBILE DEVICE

FIELD

The subject matter disclosed herein relates generally to authenticating a user on a mobile device.

BACKGROUND

Mobile communication devices are pervasive in today's society. As a result, users store, access, and run applications with access to sensitive personal or professional data. For example, a user may access a bank account via their mobile device, and the mobile device often stores account numbers, login credentials, and other data needed for accessing the bank account. As another example, a user may access their work email messages via stored login credentials.

To prevent unauthorized access to a mobile device, and thus the sensitive data, security measures that restrict access to the mobile device are employed. One such measure is requiring a user to enter a passcode as a condition precedent to accessing the mobile device. Another measure involves employing a fingerprint scanner on the mobile device, and collecting a biometric data sample each time a user attempts to access the mobile device. Yet another security measure involves the use of facial recognition in lieu of a passcode.

These measures, however, are not secure, provide a poor user experience, and/or subject to spoofing. That is, passcode entry often fails to provide a high level of access security as passcodes are easily hackable. Furthermore, security measures, such as fingerprint scanning, require the addition of costly hardware not generally found on mobile devices, and may result in an overly cumbersome user access experience. Finally, facial recognition analysis can be spoofed with still images, or video, of a user with access to the mobile device. Although liveness checks requiring users to blink or use facial expressions may be included in facial recognition analysis based approaches, these approaches can still be spoofed with videos of the user with access to the mobile device, and are inconvenient to users seeking access to the mobile device.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
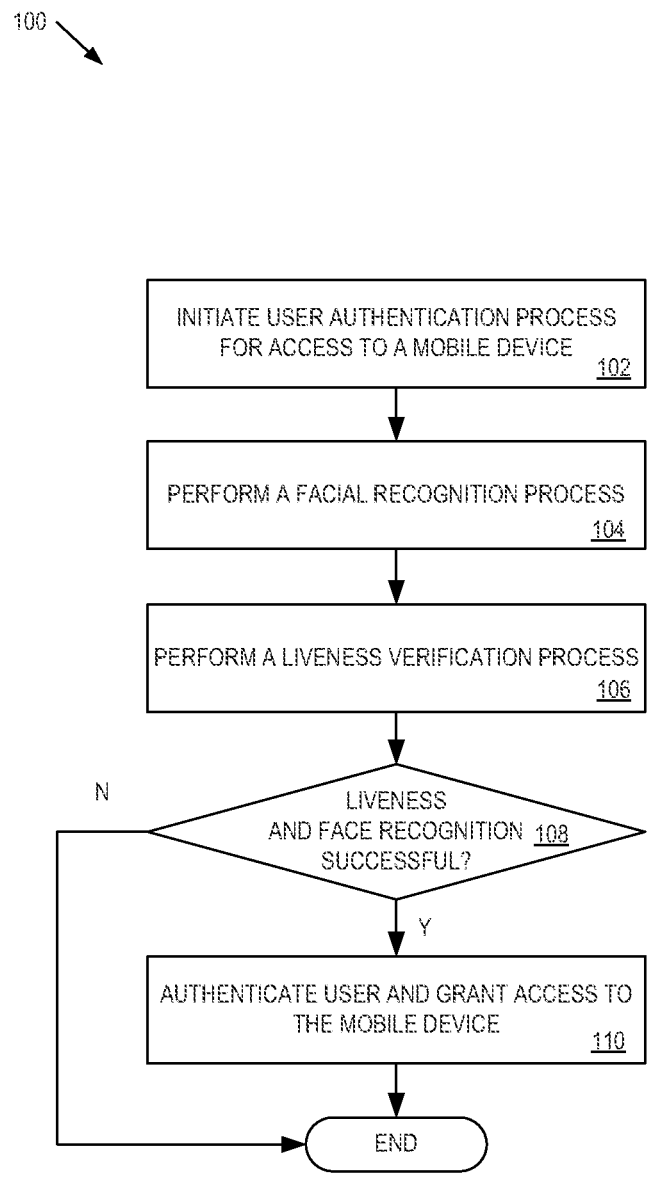
FIG. 1 is a flow diagram of one embodiment of a method for authenticating a user on a mobile device based on liveness verification and facial recognition analysis.

FIG. 1 is a flow diagram of one embodiment of a method 100 for authenticating a user on a mobile device based on liveness verification and facial recognition analysis. The method 100 is performed by processing logic that may comprise hardware (circuitry, dedicated logic, etc.), software (such as is run on a general purpose computer system or a dedicated machine), firmware, or a combination. In one embodiment, the method 100 is performed by a mobile device (for example, mobile device 210 discussed below in FIG. 2).

Referring to FIG. 1, processing logic begins by initiating a user authentication process for access to a mobile device (processing block 102). In one embodiment, mobile device is a mobile computing device, such as a mobile telephone, personal digital assistant, tablet computer, etc. capable of sending and receiving wireless communications over a cellular and/or wireless communication network. For example, the user authentication process is initiated when a user seeks to access a locked or protected mobile device, such as when user 460 illustrated in FIG. 4 seeks to be authenticated for purposes of accessing mobile device 452.

Processing logic performs a facial recognition process as part of user authentication to the mobile device (processing block 104). In one embodiment, in response to the user authentication process being initiated, processing logic activates one or more image capture mechanisms, such as digital cameras 454-1 and 454-2 of the mobile device 452 (see FIG. 4), for capturing digital image data. As discussed herein, digital image data may include digital video data as well as still digital video image data. In one embodiment, the image capture mechanisms may include a front-facing camera 454-1 on the mobile device as well as a rear-facing camera 454-2 on the mobile device, although additional cameras may also be utilized. The captured image data attempts to capture an image of a face 456-1 of the user 460 seeking authentication to the mobile device. Once an image of a user's face is captured, processing logic extracts facial features from the image data, and compares those features against a facial recognition database of authorized users. When the extracted facial features match facial features of an authorized user in the database, the facial recognition process has found that the captured image data corresponds to an authorized user of the mobile device.

Figure 4:
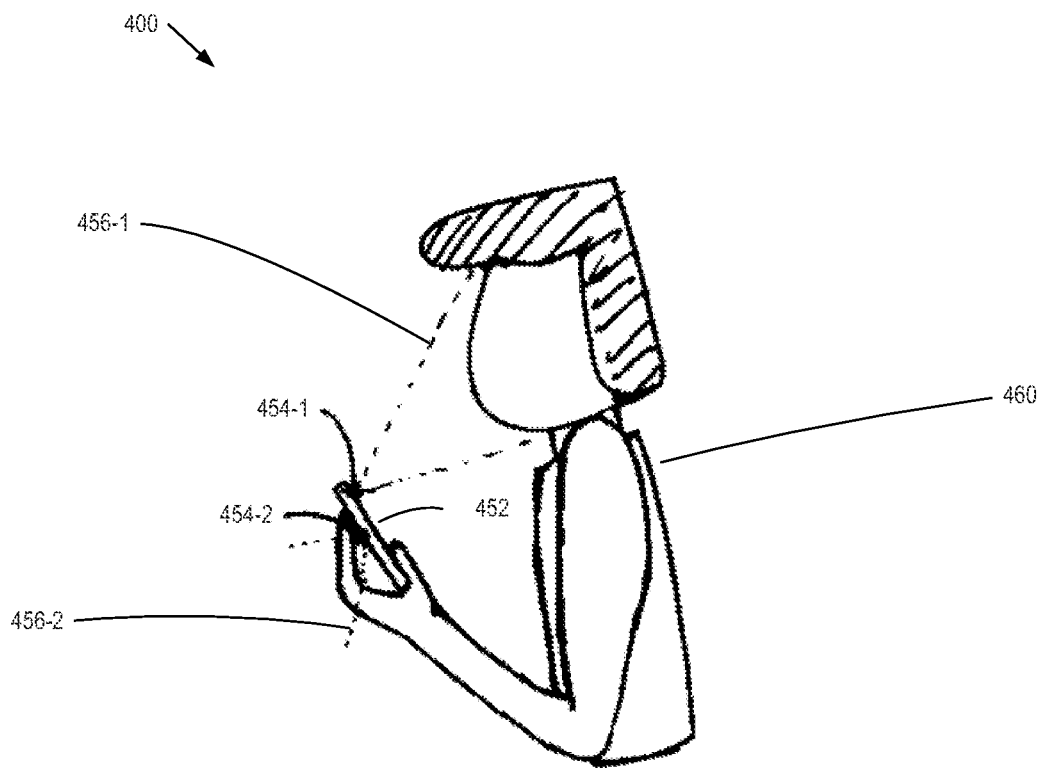
FIG. 4 shows an example of user authentication by a mobile device according to the embodiments described herein.

Processing logic also performs a liveness verification process as part of user authentication to the mobile device (processing block 106). In one embodiment, liveness verification is performed by processing logic to ensure that the mobile device is not being spoofed during facial recognition by a user that is not authorized to access the mobile device. For example, a nefarious user (such as one not authorized to access the mobile device) may hold a video display or image of an authorized user in front of the image capture mechanism, in an attempt to spoof the user authentication process into inappropriately recognizing an authorized face for the unauthorized user. However, in one embodiment, the liveness verification process guards against spoofing attacks by ensuring that the recognized face corresponds to a live user, and corresponds to the current user that is in fact seeking access to the mobile device. As illustrated in FIG. 4, the front facing camera 454-1 captures a first digital video data 456-1 of a user that includes the user's face, while the rear facing camera 454-2 captures a second digital video data 456-2 of another part of the user, such as the user's hand as illustrated in FIG. 4.

In one embodiment, and as discussed in greater detail below, processing logic performs the liveness verification process by estimating user pulse rates from the first and second digital video data, and attempting to correlate the pulse rates. When the pulse rates can be correlated by processing logic, then processing logic can conclude that the image captured by the front-facing camera 454-1 and the rear-facing camera 454-2 are capturing live images of the same person. Furthermore, processing logic can conclude from the facial recognition results that the person is an authorized used and not a spoofing user, such as an unauthorized person that is holding an image of the authorized user in view of the front-facing camera.

Processing logic then determines whether the liveness verification and facial recognition processes were both successfully completed (processing block 108). When either process fails, the authentication process fails, and the user is denied access to the mobile device. However, when both the liveness verification and facial recognition processes are successful, processing logic authenticates the user to the mobile device and grants the authenticated user access to the mobile device (processing block 110). The granting of access may include one or more of unlocking the mobile device for a user, loading a profile of the mobile device associated with the identified user, decrypting content on the mobile device for which the identified use has access rights, online payment authorization (e.g., authorizing purchases from a mobile applications store, authorizing purchases from an online retailer, etc.), as well as any other application that includes user authentication on a mobile device.

In one embodiment, the liveness verification process and the facial recognition process form a two-fold authentication process that is both secure and convenient for a user. That is, the authentication process is secured by facial recognition analysis to ensure that only a specifically recognized user is able to access the mobile device. Furthermore, the authentication process secures against spoofing by utilizing pulse rate analysis and pulse correlation, to ensure that the person seeking access to the mobile device is both holding the mobile device and corresponds to the image captured for facial recognition purposes. Finally, both the facial recognition and liveness verification are performed in a manner that is convenient and unobtrusive for a user.

In one embodiment, the liveness verification and facial recognition processes of processing blocks 104 and 106 are performed in parallel. In another embodiment, the liveness verification and facial recognition processes are performed in serial, such that facial recognition is determined prior to liveness verification, or liveness verification is determined prior to facial recognition. The order illustrated in FIG. 1 is illustrative, and need not be the order in which the liveness verification and facial recognition processes are performed. Furthermore, in one embodiment, regardless of whether the liveness verification and facial recognition processes are performed in parallel or one after the other, both processes can perform their respective verification on the same data. For example, image data captured by a front facing camera of the mobile device can be utilized during the liveness verification process by performing pulse rate estimation on the image data. Furthermore that image data may also be utilized by the facial recognition process for performing one or more facial recognition techniques.

Figure 2:
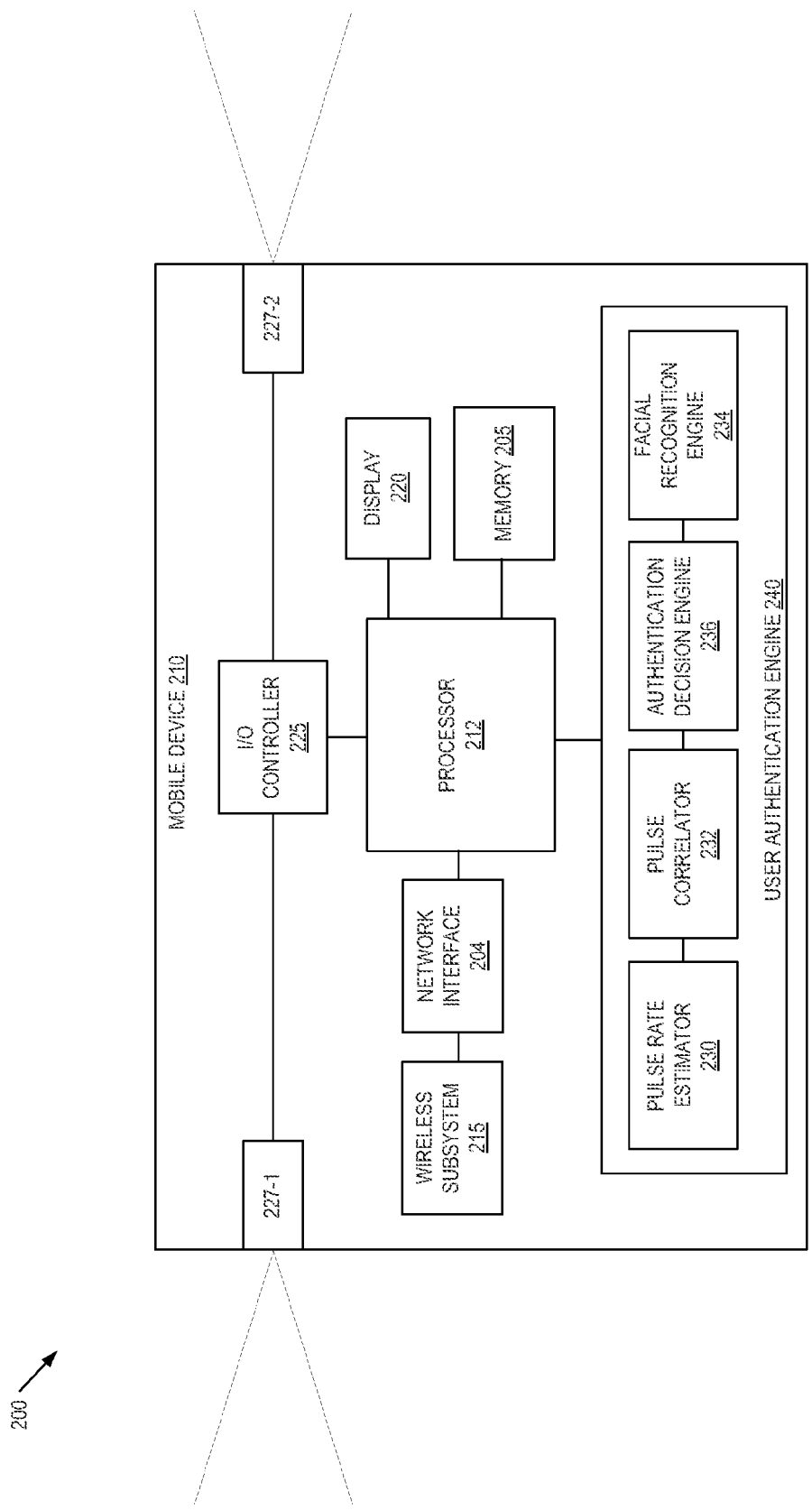
FIG. 2 is block diagram of one embodiment of a mobile device that implements user authentication processes according to the embodiments described herein.

FIG. 2 is block diagram of one embodiment 200 of a mobile device 210 that implements user authentication processes according to the embodiments described herein.

In one embodiment, mobile device 210 is a system, which may include one or more processors 212, a memory 205, I/O controller 225, digital cameras 227-1 and 227-2, network interface 204, and display 220. Mobile device 210 may also include a user authentication engine 240 for authenticating a user to mobile device 210. In one embodiment, user authentication engine 240 includes a number of processing modules, which may be implemented as hardware, software, firmware, or a combination, such as pulse rate estimator 230, pulse correlator 232, facial recognition engine 234, and authentication decision engine 236.

It should be appreciated that mobile device 210 may also include, although not illustrated, a user interface (e.g., one or more microphones, keyboard, touch-screen, or similar devices), a power device (such as a battery), as well as other components typically associated with electronic devices. Network interface 204 may also be coupled to a number of wireless subsystems 215 (e.g., Bluetooth, WiFi, Cellular, or other networks) to transmit and receive data streams through a wireless link to/from a network, or may be a wired interface for direct connection to networks (e.g., the Internet, Ethernet, or other wireless systems).

Memory 205 may be coupled to processor 212 to store instructions for execution by processor 212. In some embodiments, memory 205 is non-transitory, such as a non-transitory computer readable storage medium. Memory 205 may also store a facial recognition database of users that are authorized to access the mobile device 210. Memory 205 may also store user authentication engine 240 and one or more modules of the user authentication engine 240 (i.e., pulse rate estimator 230, pulse correlator 232, facial recognition engine 234, and authentication decision engine 236) to implement embodiments described herein. It should be appreciated that embodiments of the invention as will be hereinafter described may be implemented through the execution of instructions, for example as stored in the memory 205 or other element, by processor 212 of mobile device 210 and/or other circuitry of mobile device 210 and/or other devices. Particularly, circuitry of mobile device 210, including but not limited to processor 212, may operate under the control of a program, routine, or the execution of instructions to execute methods or processes in accordance with embodiments of the invention. For example, such a program may be implemented in firmware or software (e.g., stored in memory 205 and/or other locations) and may be implemented by processors, such as processor 212, and/or other circuitry of mobile device 210. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by mobile device 210 itself and/or some or all of the functions, engines or modules described herein may be performed by another system connected through I/O controller 225 or network interface 204 (wirelessly or wired) to mobile device 210. Thus, some and/or all of the functions may be performed by another system and the results or intermediate calculations may be transferred back to mobile device 210. In some embodiments, such other device may comprise a server (not shown). In some embodiments, the other device is configured to predetermine the results, for example, based on a known configuration of the mobile device 210.

In one embodiment, mobile device 210 receives a user request or other user command through I/O controller 225 to initiate an authentication process. User authentication engine 240 processes the request and activates front-facing camera 227-1 and rear-facing camera 227-2. User authentication engine 240 may selectively activate front-facing camera 227-1 and rear-facing camera 227-2 depending on which authentication process (such as liveness verification or facial recognition) is currently being performed. User authentication engine 240 may also activate both cameras 227-1 and 227-2 when the liveness verification or facial recognition processes are performed in parallel. The activation of the cameras 227-1 and 227-2 causes mobile device 210 to capture digital video data with each camera.

User authentication engine 240 instructs facial recognition engine 234 to perform one or more facial recognition processes on captured digital video data. Facial recognition engine 234 analyzes the digital video data from front-facing camera 227-1 to locate a face within the digital video data. Once facial recognition engine 234 has located a face, facial recognition engine 234 performs a facial recognition process on the face depicted in the image data. In one embodiment, facial recognition engine 234 extracts one or more facial recognition features (e.g., facial landmarks, relative positions of facial features, etc.) of the face depicted in the image data. Facial recognition engine 234 then compares the extracted facial recognition features to a database, stored in memory 205, of authorized user's facial recognition features. For example, a mobile device may be associated with 3 authorized users, and the facial recognition database in memory 205 stores the pertinent facial recognition features for each authorized user. Then, based on the comparison of facial recognition features, facial recognition engine 234 notifies authentication decision engine 236 of the facial recognition results.

User authentication engine 240 further instructs pulse rate estimator 230 to perform pulse rate estimation on digital video data captured by both front-facing camera 227-1 and rear-facing camera 227-2. In one embodiment, pulse rate estimator analyzes each video data to extract a pulse rate associated with a user depicted in each digital video image data. In one embodiment, pulse rate estimator 230 performs Eulerian Video Magnification on the digital video data. In Eulerian Video Magnification (EVM), pulse rate estimator 230 applies spatial decomposition to the video data, applies temporal filtering to video frames, and amplifies the results to visualize the flow of blood in a user's skin over a period of time (e.g., the face captured in the video data 456-1 by front-facing camera 454-1 or 227-1, as well as the hand, arm, etc. captured in the video data 456-2 by rear-facing camera 456-2 or 227-2). EVM analysis can then quantify the temporal tone color variation in the user's skin over the period of time. From this visualized and quantified temporal color variation, a pulse rate, pulse magnitude, as well as other pulse related factors, can be extracted from video data. The EVM analysis of the front-facing camera 227-1 and rear-facing camera 227-2 video data are utilized by pulse rate estimator 230 to generate estimated pulse rates for the user seeking authentication to mobile device 210.

The estimated pulse rates are provided to pulse correlator 232. In one embodiment, pulse correlator 232 performs statistical analysis on the pulse rates to calculate the cross-correlation between the two pulse signals corresponding to the front-facing and rear facing camera respectively to determine whether the estimated pulse rates correspond (i.e., belong to the same user). In embodiments, the cross-correlation of the two pulse signals is determined using methods such as, but not limited to, signal convolution analysis in the time-domain or frequency-domain. In one embodiment, pulse correlator 232 shifts one or both pulse rate estimates to account for a timing difference that occurs when pulse rate estimates are generated from different locations on a user's body. That is, a first pulse rate estimate may be statistically related to a second pulse rate estimate, but must be time shifted to account for the time it would take blood flow to reach different parts of the user's body. When the estimated and adjusted pulse rates correspond, pulse correlator 232 determines that the image data captured by front-facing camera 227-1 and rear-facing camera 227-2 are capturing live image data of the same user.

In one embodiment, pulse correlator 232 determines that the estimated and adjusted pulse rates correspond with one another based on a statistical analysis of the two estimated pulse rates. The statistical analysis determines a measure of how related the two pulse rates are to one another, such as by computation of cross-correlation. In one embodiment, pulse correlator 232 determines the statistical confidence of a pulse match, and compares this confidence of a pulse match to a pulse match threshold value. For example, a pulse match may only be accepted by pulse correlator 232 when the confidence associated with the match exceeds a 99% confidence threshold. In one embodiment, the threshold value may be set to an initial threshold value, and adjusted based on one or more ambient conditions associated with video data from which the pulse rates were determined. For example, if the video data indicates one or more of a good light condition, steady image capture, long video duration, etc., the threshold may remain at the initial value or may be adjusted to a higher value. As another example, if the video data indicates one or more of a low light condition, a low image quality condition, shaky image capture, etc., the threshold may remain at the initial value or may be adjusted to a lower value. In one embodiment, the front and rear facing cameras may independently influence the adjustment of the correlation threshold based on ambient conditions associated with each camera. In one embodiment, the pulse match is determined by pulse correlator 232 when the statistical likelihood of a pulse match exceeds the pulse match threshold. Pulse correlator 232 then notifies authentication decision engine 236 of the pulse match results relative to the confidence threshold.

Decision engine 240 determines whether the user is recognized as an authorized user based on results of the facial recognition engine's 234 video data analysis results (i.e., the recognized user is an authorized user of the mobile device 210). Authentication decision engine 236 also determines whether the estimated pulse rates determined by pulse correlator 232 indicate a pulse match in the video data. When both the facial recognition analysis and the pulse correlation results are successfully completed, user authentication engine 240 authenticates the user, thereby granting the user access to the mobile device.

As discussed herein, the pulse rate estimation and the facial recognition analysis may be performed by the pulse rate estimator 230 and the facial recognition engine 234 in parallel. Furthermore, the pulse rate estimator 230 and the facial recognition engine 234 may utilize the same video data for analysis purposes. In this embodiment, the authentication process would result in the added security that the recognized face corresponds to the live person that is currently holding the mobile device and is currently seeking authentication.

Figure 3:
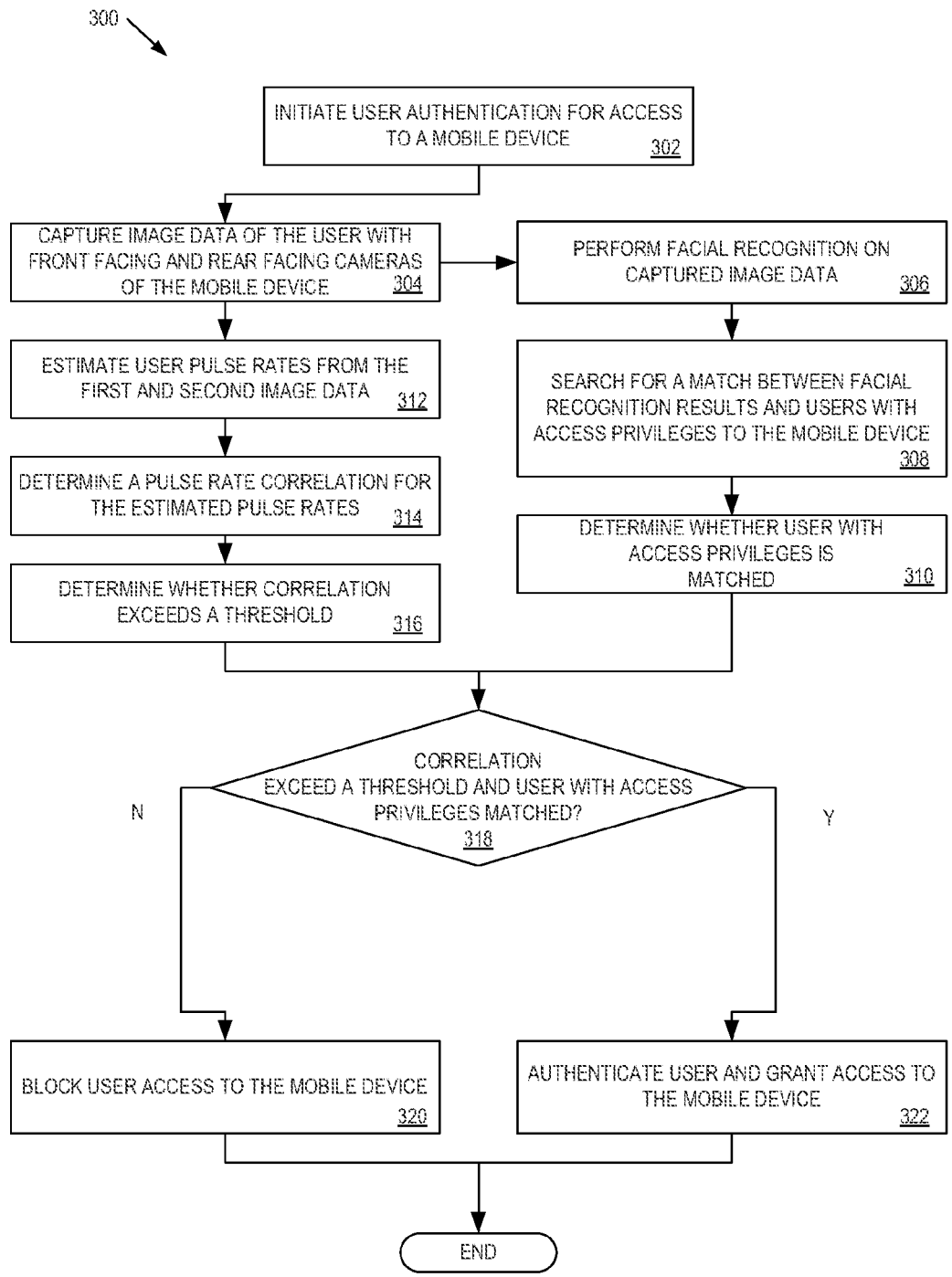
FIG. 3 is a flow diagram of one embodiment of a method for authenticating a user on a mobile device based on pulse rate correlation and facial recognition analysis.

FIG. 3 is a flow diagram of one embodiment of a method for authenticating a user on a mobile device based on pulse rate correlation and facial recognition analysis. The method 300 is performed by processing logic that may comprise hardware (circuitry, dedicated logic, etc.), software (such as is run on a general purpose computer system or a dedicated machine), firmware, or a combination. In one embodiment, the method 300 is performed by a mobile device (such as mobile device 210).

Referring to FIG. 3, processing logic begins by initiating a user authentication process for accessing a mobile device (processing block 302). The user authentication process may be initiated whenever a mobile device attempts to transition from an inactive state to an active state, such as transitioning from sleep to wake, from locked to unlocked, etc. The user authentication process may also be initiated in response to a user request to access a locked mobile device, or in response to an authentication demand from any application/process running on the mobile device (e.g., an authentication demand from an online app store, online retailer, etc.). In one embodiment, access to the mobile device is predicated on successful authentication of the user by processing logic as discussed herein.

Processing logic captures image data of the user with a front-facing camera and a rear-facing camera of the mobile device (processing block 304). In one embodiment, captured image data is digital video data captured by the cameras. Processing logic performs one or more facial recognition processes on the captured image data (processing block 306). As discussed above, the facial recognition processes may include locating an image of a face depicted in the image data, and extracting visual features from the located face image. In the embodiments discussed herein, any number of facial features may be extracted, such as features corresponding to the eyes, nose, mouth, jaw, ears, cheekbones, etc., and their relative positions to one another. Processing logic then searches for a match between the facial recognition results and facial recognition features associated with users that have access privileges to the mobile device (processing block 308). The match is determined by processing logic by comparing a feature set associated with the face located in the image, with feature sets of the authorized users of the mobile device. From the comparison, processing logic determines a likelihood that the feature set associated with the face located in the image matches an authorized user's feature set to determine whether a user with access privileges is matched (processing block 310). When this likelihood exceeds a threshold likelihood, the face located in the digital video data matches an authorized user. When the likelihood does not exceed the threshold, the face is determined not to match an authorized user. In one embodiment, in the event that processing logic determines that the face does not match an authorized user (processing block 318), processing logic may proceed immediately to block 320 to block user access to the mobile device.

Processing logic also estimates user pulse rates from the first and second image data (processing block 312). The first and second image data may correspond to first and second digital videos captured by a front-facing and rear-facing camera of a mobile device. In one embodiment, processing logic performs EVM analysis to derive a temporal variation in skin tone of a user captured in the first and second digital videos. From the temporal variation in skin tone, a pulse rate may be estimated for the user from each of the first and second digital videos. These pulse rates are then correlated (processing block 314), by temporally shifting one or both estimated pulse rates, by adjusting the magnitude of one or both estimated pulse rates, and/or determining a statistical likelihood that the pulse rates match one another by comparison of the likelihood of a match to a pulse match threshold value (processing block 316). In one embodiment, although no illustrated, when the pulse match likelihood does not exceed the threshold, processing logic may proceed immediately to block 320 to block user access to the mobile device.

As discussed herein, the pulse rate estimation and correlation analysis, and the facial recognition processes, may be carried out by processing logic in parallel, as well as one after the other. Furthermore, in an embodiment where the authentication processes are serially performed, facial recognition is performed prior to pulse rate estimation and correlation.

Processing logic determines whether a correlation between the estimated pulse rates (derived from the first and second image data) exceeds a threshold and whether the user matches a user with access privileges (processing block 318). When the correlation of pulse rates is sufficiently close (for example, when the correlation exceeds a threshold), and when the facial features extracted from a user seeking authentication match facial features of an authorized user, processing logic authenticates the user and grants the user access to the mobile device (processing block 322). Otherwise, processing logic blocks user access to the mobile device (processing block 320).

It should be appreciated that when the devices discussed herein is a mobile or wireless device, that it may communicate via one or more wireless communication links through a wireless network that are based on or otherwise support any suitable wireless communication technology. For example, in some aspects computing device or server may associate with a network including a wireless network. In some aspects the network may comprise a body area network or a personal area network (such as an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web-sites, etc.

The teachings herein may be incorporated into (for example, implemented within or performed by) a variety of apparatuses or devices. For example, one or more aspects taught herein may be incorporated into a phone (such as a cellular phone), a personal data assistant (PDA), a tablet, a mobile computer, a laptop computer, an entertainment device (e.g., a music or video device), a headset (e.g., headphones, an earpiece, etc.), a medical device (e.g., a biometric sensor, a heart rate monitor, a pedometer, an Electrocardiography (EKG) device, etc.), a user I/O device, a computer, a server, a point-of-sale device, a set-top box, or any other suitable device. These devices may have different power and data requirements and may result in different power profiles generated for each feature or set of features.

In some aspects a wireless device may comprise an access device (for example, a Wi-Fi access point) for a communication system. Such an access device may provide, for example, connectivity to another network (e.g., a wide area network such as the Internet or a cellular network) via a wired or wireless communication link. Accordingly, the access device may enable another device (for example, a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for authenticating a user on a mobile device, comprising:

initiating authentication of the user for access to the mobile device, wherein access to the mobile device is granted upon successful authentication of the user by the mobile device;

capturing first video data from a first camera of the mobile device, wherein the first video data captures at least an image of a face of the user;

capturing second video data from a second camera of the mobile device while the first video data is being captured by the first camera, wherein the second video data captures at least an image of a different part of the user;

performing face recognition analysis on the image of the face of the user to determine an identity of the user;

determining a first pulse information of the user from the first video data and a second pulse information of the user from the second video data;

determining whether the first pulse information and the second pulse information indicate a pulse match based on a correlation between pulse rates determined from the first pulse information and the second pulse information, wherein one or both of the first pulse information and the second pulse information are temporally shifted when determining the correlation to account for a timing difference that occurs when pulse rate estimates are generated from video data of different locations of a body of the user; and authenticating the user for access to the mobile device when a pulse match is determined and the determined identity of the user has permission to access the mobile device.

2. The method of claim 1, wherein the determination of the first pulse information and the second pulse information comprises:

determining a temporal variation in a skin tone of the user from captured video data; and determining a pulse of the user based on the temporal variation in the skin tone of the user over a period of time.

3. The method of claim 2, wherein the pulse match is determined from the first pulse information and the second pulse information when there is a correlation between temporal variation in skin tone determined from the first video data and temporal variation in skin tone determined from the second video data.

4. The method of claim 1, wherein the face recognition analysis and the first pulse information are determined concurrently.

5. The method of claim 1, wherein the face recognition analysis is performed prior to determination of the first pulse information and the second pulse.

6. The method of claim 1, wherein the face recognition analysis and the first pulse information are determined from a common segment of the first video data.

7. The method of claim 1, wherein determining whether the first pulse information and the second pulse information indicate a pulse match, further comprises:
 correlating the first pulse information with the second pulse information;
 determining a likelihood of the pulse match based on the correlated first pulse information and second pulse information;
 comparing the determined likelihood to a pulse match threshold; and
 determining the first pulse information matches the second pulse information when the determined likelihood exceeds the pulse match threshold.

8. The method of claim 7, further comprising:
 performing regression analysis on the correlated first pulse information and second pulse information to determine the likelihood of the pulse match.

9. The method of claim 7, wherein the pulse match threshold is adjusted based on one or more ambient conditions associated with the capture of the first video data and the second video data.

10. The method of claim 7, wherein correlating the first pulse information with the second pulse information further comprises:
 temporally shifting the second pulse information to account for a difference in pulse timing associated with a difference in location on the user's body from which the first pulse information and the second pulse information were derived.

11. The method of claim 1, wherein the first camera is a front-facing camera of the mobile device, and the second camera is a rear-facing camera of the mobile device.

12. A non-transitory computer readable storage medium including instructions that, when executed by a processor, cause the processor to perform a method for authenticating a user on a mobile device, the method comprising:
 initiating authentication of the user for access to the mobile device, wherein access to the mobile device is granted upon successful authentication of the user by the mobile device;
 capturing first video data from a first camera of the mobile device, wherein the first video data captures at least an image of a face of the user;
 capturing second video data from a second camera of the mobile device while the first video data is being captured by the first camera, wherein the second video data captures at least an image of a different part of the user;
 performing face recognition analysis on the image of the face of the user to determine an identity of the user;
 determining a first pulse information of the user from the first video data and a second pulse information of the user from the second video data;
 determining whether the first pulse information and the second pulse information indicate a pulse match based on a correlation between pulse rates determined from the first pulse information and the second pulse information, wherein one or both of the first pulse information and the second pulse information are temporally shifted when determining the correlation to account for a timing difference that occurs when pulse rate estimates are generated from video data of different locations of a body of the user; and
 authenticating the user for access to the mobile device when a pulse match is determined and the determined identity of the user has permission to access the mobile device.

13. The computer readable storage medium of claim 12, wherein the determination of the first pulse information and the second pulse information comprises:
 determining a temporal variation in a skin tone of the user from captured video data; and
 determining a pulse of the user based on the temporal variation in the skin tone of the user over a period of time.

14. The computer readable storage medium of claim 13, wherein the pulse match is determined from the first pulse information and the second pulse information when there is a correlation between temporal variation in skin tone determined from the first video data and temporal variation in skin tone determined from the second video data.

15. The computer readable storage medium of claim 12, wherein the face recognition analysis and the first pulse information are determined concurrently.

16. The computer readable storage medium of claim 12, wherein the face recognition analysis is performed prior to determination of the first pulse information and the second pulse.

17. The computer readable storage medium of claim 12, wherein the face recognition analysis and the first pulse information are determined from a common segment of the first video data.

18. The computer readable storage medium of claim 12, wherein determining whether the first pulse information and the second pulse information indicate a pulse match, further comprises:
 correlating the first pulse information with the second pulse information;
 determining a likelihood of the pulse match based on the correlated first pulse information and second pulse information;
 comparing the determined likelihood to a pulse match threshold; and
 determining the first pulse information matches the second pulse information when the determined likelihood exceeds the pulse match threshold.

19. The computer readable storage medium of claim 18, further comprising:
 performing regression analysis on the correlated first pulse information and second pulse information to determine the likelihood of the pulse match.

20. The computer readable storage medium of claim 18, wherein the pulse match threshold is adjusted based on one or more ambient conditions associated with the capture of the first video data and the second video date.

21. The computer readable storage medium of claim of claim 18, wherein correlating the first pulse information with the second pulse information further comprises:
 temporally shifting the second pulse information to account for a difference in pulse timing associated with a difference in location on the user's body from which the first pulse information and the second pulse information were derived.

22. The mobile device of claim 21, wherein the pulse correlator to determine whether the first pulse information and the second pulse information indicate a pulse match, further comprises the pulse correlator to correlate the first pulse information with the second pulse information, determine a likelihood of the pulse match based on the correlated first pulse information and second pulse information, compare the determined likelihood to a pulse match threshold, and determine the first pulse information matches the second pulse information when the determined likelihood exceeds the pulse match threshold.

23. The computer readable storage medium of claim 12, wherein the first camera is a front-facing camera of the mobile device, and the second camera is a rear-facing camera of the mobile device.

24. A mobile device to perform user authentication, comprising:
  a user authentication engine to initiate authentication of the user for access to the mobile device, wherein access to the mobile device is granted upon successful authentication of the user by the mobile device,
  a first video camera communicatively coupled with the user authentication engine to capture first video data in response to the authentication being initiated, wherein the first video data captures at least an image of a face of the user,
  a second video camera communicatively coupled with the user authentication engine to capture second video data in response to the authentication being initiated and while the first video data is being captured by the first video camera, wherein the second video data captures at least an image of a different part of the user,
  wherein the user authentication engine comprises
    a facial recognition engine to perform face recognition analysis on the image of the face of the user in the first video data to determine an identity of the user,
    a pulse rate estimator to determine a first pulse information of the user from the first video data and a second pulse information of the user from the second video data,
    a pulse correlator to determine whether the first pulse information and the second pulse information indicate a pulse match based on a correlation between pulse rates determined from the first pulse information and the second pulse information, wherein one or both of the first pulse information and the second pulse information are temporally shifted by the pulse correlator when determining the correlation to account for a timing difference that occurs when pulse rate estimates are generated from video data of different locations of a body of the user, and
    an authentication decision engine to authenticate the user for access to the mobile device when a pulse match is determined and the determined identity of the user has permission to access the mobile device.

25. The mobile device of claim 24, wherein the pulse correlator to determine whether the first pulse information and the second pulse information further comprises the pulse correlator to determine a temporal variation in a skin tone of the user from captured video data, and determine a pulse of the user based on the temporal variation in the skin tone of the user over a period of time.

26. The mobile device of claim 25, wherein the pulse match is determined from the first pulse information and the second pulse information when there is a correlation between temporal variation in skin tone determined from the first video data and temporal variation in skin tone determined from the second video data.

27. The mobile device of claim 24, wherein the facial recognition engine performs the face recognition analysis and the pulse rate estimator determines the first pulse information concurrently.

28. A system for authenticating a user on a mobile device, comprising:
  means for initiating authentication of the user for access to the mobile device, wherein access to the mobile device is granted upon successful authentication of the user by the mobile device;
  means for capturing first video data from a first camera of the mobile device, wherein the first video data captures at least an image of a face of the user;
  means for capturing second video data from a second camera of the mobile device while the first video data is being captured by the first camera, wherein the second video data captures at least an image of a different part of the user;
  means for performing face recognition analysis on the image of the face of the user to determine an identity of the user;
  means for determining a first pulse information of the user from the first video data and a second pulse information of the user from the second video data;
  means for determining whether the first pulse information and the second pulse information indicate a pulse match based on a correlation between pulse rates determined from the first pulse information and the second pulse information, wherein one or both of the first pulse information and the second pulse information are temporally shifted when determining the correlation to account for a timing difference that occurs when pulse rate estimates are generated from video data of different locations of a body of the user; and
  means for authenticating the user for access to the mobile device when a pulse match is determined and the determined identity of the user has permission to access the mobile device.

29. The system of claim 28, wherein the determination of the first pulse information and the second pulse information comprises:
  means for determining a temporal variation in a skin tone of the user from captured video data; and
  means for determining a pulse of the user based on the temporal variation in the skin tone of the user over a period of time.

30. The system of claim 28, wherein the means for determining whether the first pulse information and the second pulse information indicate a pulse match, further comprises:
  means for correlating the first pulse information with the second pulse information;
  means for determining a likelihood of the pulse match based on the correlated first pulse information and second pulse information;
  means for comparing the determined likelihood to a pulse match threshold; and
  means for determining the first pulse information matches the second pulse information when the determined likelihood exceeds the pulse match threshold.

* * * * *